United States Patent Office 2,750,305
Patented June 12, 1956

2,750,305

COMPOSITION AND METHOD FOR HYDROPHOBIZING OF TEXTILES

Dmitry Michael Gagarine and Henry Repokis, Clemson, S. C., assignors to Deering Milliken Research Corporation, Pendleton, S. C., a corporation of Delaware No Drawing. Application October 5, 1953,
Serial No. 384,333

35 Claims. (Cl. 117—103)

The present invention relates to an emulsion useful for rendering textile fabrics water-repellent; to a process for making such an emulsion; and to a process for rendering textile fabrics water-repellent.

It is well known in the art that certain silicone resins when applied to textile fabrics, are capable of imparting water-repellency thereto.

It is also known in the art that silicone resins may be emulsified in water with the aid of an emulsifying agent such as a soap, a sulfated oil, a sulfonic acid, a quaternary ammonium compound or the like. It is also known that metallic salts aid in the polymerization of silicone resins containing an active hydride radical. Catalysts which have been proposed for this purpose include zinc, cadmium, copper, iron, manganese, lead, chromium, calcium, sodium, potassium, etc., salts of organic acids such as naphthoic acid and 2-ethyl hexoic acid.

A preferred method known to the art for the application of silicone resins to a textile fabric comprises the application of the resin from an aqueous emulsion. In a typical method of this type, the silicone resin is emulsified in water with the aid of an emulsifying agent and the catalyst for the resin is emulsified separately. The two emulsions are then mixed and the textile fabric is passed through the resultant emulsion and then dried and cured. During the drying operation, the oil phase particles tend to coalesce with a resultant mixing of the catalyst with the silicone resin.

In the emulsion application of a silicone resin, the degree of coalescense is limited so that as a result the silicone resin dries on the fabric in the form of discrete particles which provide a discontinuous hydrophobic coating. The discontinuous nature of the silicone resin film resulting from the emulsion application of the resin results in a much lower effectiveness than when a continuous coating is provided. This latter fact becomes obvious when a comparison is made between the application of a silicone resin from aqueous emulsion and the application of the same resin from an organic solvent solution.

The application of the resin from the aqueous emulsions of the prior art possesses two additional disadvantages. The first of these results from the fact that the emulsifying agent commonly employed acts as a rewetting agent and maximum water-repellency cannot be obtained until the emulsifying agent is washed from the fabric. The second disadvantage is the fact that the curing temperature necessary to cure the silicone resin is about 100° F. higher than the temperature which is required to cure the same resin when it is applied from an organic solvent solution. The need for a high curing temperature is particularly undesirable because of the fact that certain fabrics, notably fabrics prepared from polyester fibers, should not be heated above a certain maximum temperature. In the case of polyester fabrics this temperature is about 250° F. which is often lower than the temperature required to cure the silicone resins applied by the prior art emulsions.

On the other hand, the application of a silicone resin from a solution in an organic solvent is productive of a high degree of water-repellency which presumably results from the continuous nature of the silicone resin film which is obtainable thereby. However, the application of silicone resins to textiles by the solution technique possesses severe disadvantages such as high cost, excessive fire and health hazards involved in the handling of explosive or toxic solvents, and the necessity for solvent recovery systems. Therefore, although the results obtainable by the solution application of silicone resins are far superior to those obtainable by the emulsion application, the emulsion application has been generally preferred.

It is a primary object of the present invention to provide an aqueous emulsion of a silicone resin which is capable of being applied to a textile fabric and which will provide the advantageous results obtainable from the solution application technique with the economy and the convenience which characterizes the application of such a resin from an aqueous emulsion.

It is another object of the invention to provide a process for rendering textile fabric water-repellent which involves the application of the emulsion of the invention to a textile fabric.

The above and other objects are accomplished by the provision of an emulsion that breaks on partial drying to a greater than normal extent so that there is formed an oily layer of resin on the surfaces of the emulsion-impregnated textile fabric. During the continuance of the drying operation, the resin layer coalesces and is deposited on the surface of the fabric in a continuous or nearly continuous film which provides a high degree of water-repellency.

In addition to enabling the obtention of a high degree of water-repellency, the emulsion and process of the invention are advantageous otherwise. A primary advantage resides in the fact that the desired high degree of water-repellency can be obtained by the deposition of considerably less silicone resin on the fabric than that required in the application of prior art emulsions. Not only is this economical but also the hand of the fabric is not appreciably altered which means that the slick feel characteristic of fabrics treated with the prior art emulsions can be avoided. Furthermore, the emulsions of the invention require lower curing temperatures than the prior art emulsions and thus it can be used on all types of fabric without fear of damaging the fabric by excessive heat.

In accordance with the present invention, the emulsion comprises an ammoniacal aqueous emulsion of silicone resin which contains an ammonium salt of an organic acid as the emulsifying agent and, a metal hydroxide selected from the group consisting of stannous, ferrous, and cuprous hydroxides as the catalytic agent.

The process of the invention comprises the steps of wetting a textile fabric with the above-described emulsion and thereafter drying the wetted fabric and curing the silicone resin thereon.

Any silicone resin having an active hydride radical may be used in the preparation of the emulsion. However, the invention is particularly applicable to the alkyl hydrogen polysiloxanes, such as the methyl hydrogen polysiloxanes, disclosed, for example, in U. S. Patent No. 2,588,366. These are commercially available materials which are sold under a variety of trade names.

The amount of silicone resin to be included in the emulsion is widely variable and depends on the method of application to be employed. As far as concerns the imparting of water-repellency to a fabric, there is no well-defined upper limit on the amount of silicone resin to be included in the emulsion, although a practical upper limit is imposed by the fact that an emulsion containing too great an amount of silicone resin will appreciable alter the texture and feel of a fabric to which it is applied. In addition, the use of a greater amount of silicone resin than that necessary to achieve the desired water-repellency is uneconomical and wasteful. For the stated reasons, the silicone resin will practically never comprise more than about 10% by weight of the emulsion and, in fact, will seldom exceed 2% by weight of the emulsion. There is likewise no precise lower limit on the amount of silicone resin to be included in the emulsion although for reasons of convenience and economy the silicone resin will seldom constitute less than about .001% by weight of the emulsion. Optimum concentrations of the silicone resin depend upon the particular procedure to be employed in applying the emulsion and are discussed in subsequent paragraphs.

As the emulsifying agent we can employ the ammonium salt of any organic, carboxylic acid, the water-soluble salts of which are known to have emulsifying ability. The preferred class of emulsifying agents comprises the ammonium salts of saturated and ethylenically unsaturated fatty acids having from about 12 to 18 carbon atoms. The preferred emulsifying agent is a mixture of ammonium myristate and ammonium palmitate. Within the preferred class other suitable emlsifying agents are, for example, the ammonium salts of lauric, palmitic, stearic, oleic, linoleic and ricinoleic acids. These emulsifying agents are preferred, not only because of superior results obtained therewith, but also because the emulsifying agents of the preferred class, unlike the salts of some organic acids, such as abietic acid, are free from objectionable odor. In addition, the preferred emulsifying agents are not known to cause irritation when in prolonged contact with the skin.

The amount of emulsifying agent to be included in the emulsion should be based on the weight of silicone resin and any amount which will result in the formation of a stable emulsion can be used. Generally this will require at least about 2.5% of emulsifying agent based on the weight of the silicone resin. While there is no fixed upper limit on the amount of emulsifying agent which can be present in the emulsion a practical upper limit is about 100% by weight of the resin. The optimum and preferred amount of emulsifying agent is between about 10 and about 30% by weight of the resin.

The metal hydroxide ingredient of the emulsion supplies metal ions which catalyze the cure of the silicone resin. Of those metal hydroxides names, stannous hydroxide is by far the preferred catalyst since tin is highly effective in promoting the cure of the silicone resin, thus enabling the use of relatively low curing temperatures. In addition stannous hydroxide is itself colorless and does not discolor the fabric to any appreciable extent. Moreover, emulsions containing stannous hydroxide appear to reduce the shinkage of wool and viscose and also provides a flame retardant effect. Ferrous hydroxide and cuprous hydroxide are functionally good catalysts but they discolor the fabric appreciably which limits their use to instances where discoloration is unimportant.

It is explained at this point that the terms "stannous hydroxide," "ferrous hydroxide," and "cuprous hydroxide" are used loosely in this specification to connote complex mixtures of compounds which result when a stannous, ferrous or cuprous salt is added to aqueous ammonia. It is known that when stannous chloride, for example, is added to aqueous ammonia, stannous hydroxide is formed almost immediately. The hydroxide, however, is unstable and intramolecular as well as intermolecular reactions probably take place with the elimination of water and the ultimate formation of anhydride polymers. Similar reactions are believed to occur in the case of ferrous and cuprous salts. Those skilled in the art are familiar with our use of the terms and will recognize the meaning thereof.

It is one of the anomalies of the invention that compounds, including hydroxides, of other metals appear to be inoperative in producing an emulsion having the characteristics desired. In most cases, compounds of other metals fail to display a strong enough catalytic effect to give a practical rate of cure which is true in spite of the fact that compounds of other metals are known to be excellent catalysts in silicone resin emulsions of the ordinary variety.

The amount of stannous, cuprous or ferrous hydroxide present in the emulsion can vary within wide limits. Under some conditions satisfactory results are obtained by employing a quantity of one of these compounds equal to as little as about 1% of the weight of silicone resin and in other instances the weight of stannous, cuprous or ferrous hydroxide advantageously present in the emulsion may be many times the weight of silicone resin. If, however, the concentration of the hydroxide in the aqueous emulsion becomes excessive, there is a tendency for the emulsion to break thus rendering it unsuitable for use in the treatment of textiles. In this connection, if difficulty is encountered it can be alleviated by diluting the emulsion, adding additional emulsifying agent, adding a stannic salt such as stannic chloride in a quantity equal to, for example, 10% to 100% of the weight of metal hydroxide in the emulsion, raising the temperature of the emulsion or by a combination of these measures. Under usual conditions, difficulty can be expected when the concentration of stannous, cuprous or ferrous hydroxide approaches 1% of the weight of the emulsion at 80° F. or 3% of the weight of the emulsion at 120° F. but by means of the above measures the weight of these hydroxides in the emulsion can, if desired, be as much as 5% of the weight of the emulsion. Since, however, the optimum concentration of the hydroxide in the emulsion in most instances, at least prior to the time treatment of the textile material is in progress, is from about 2% to 60% by weight of the silicone resin, the concentration is generally below 1% by weight of the emulsion and the above measures are not necessary.

The optimum concentration of metal hydroxide for a given emulsion is influenced to a certain extent by several variables. For example, it has been found that the amount of metal hydroxide required for optimum results increases to some extent as the amount of silicone resin in the emulsion or deposited on the textile material is decreased. It has also been found that the best results are achieved when the amount of metal hydroxide is greater than that required to react stoichiometrically with the emulsifying agent. Both of these factors should be considered in formulating a given emulsion.

In the preparation of the emulsion of the invention, the emulsifying agent is preferably formed in situ by the reaction of ammonium hydroxide and an organic acid. Similarly, the metal hydroxide is also preferably formed in situ by the reaction of ammonium hydroxide and a water-soluble stannous, ferrous, or cuprous salt capable of reacting with ammonium hydroxide to liberate the corresponding metal hydroxide. Metal salts which are capable of liberating the hydroxide in aqueous ammoniacal solution include, for example, stannous chloride, stannous sulfate, cuprous sulfate, and ferrous sulfate. An amount of ammonia in excess of the amount required to react with the fatty acid and the metal salt is employed so that the emulsion will contain some free ammonia.

It is an advantage that commercial grades of metal salts may be used in formulating the emulsion. In fact, with stannous salts much better results are obtained with commercial grades of salts than with chemically pure grades. The improved results in such a case appear to be caused by the presence of minor amounts of stannic salts which are normally present in commercial grades of stannous salts. For the best results, the stannous salt should contain at least about 5% by weight of stannic salt and amounts of stannic salt higher than this are not harmful.

It is also an advantage of the invention that ordinary tap water in lieu of distilled or deionized water may be used in preparing the emulsion. In fact, the traces of calcium and zinc ions which are almost always present in tap water appear to accelerate the cure of the silicone resin and thus tap water is preferred instead of distilled water.

While the essential ingredients of the emulsion have been described and while a satisfactory emulsion can be prepared using only these ingredients, the preparation of a good emulsion is difficult and requires the use of a colloid mill or similar apparatus. However, it has been found that if the silicone resin is dissolved in a small amount of solvent prior to the formation of the emulsion, the need for any special type of emulsifying apparatus is eliminated and a good emulsion can be prepared simply by stirring. For this reason, it is greatly preferred to add the silicone resin to the aqueous phase of the emulsion in the form of a concentrated solution. For this purpose, any of the known solvents for silicone resins can be employed such as aromatic hydrocarbons, chlorinated hydrocarbons, aliphatic alcohols, aliphatic ketones, aliphatic esters and the like. Specific examples of such solvents are acetone, isopropyl alcohol, benzene, toluene, zylene, carbon tetrachloride, chloroform, chlorobenzene, methylethylketone, butyl acetate, etc.

In the preferred embodiment, the emulsion is prepared by making up a solution of the silicone resin and fatty acid in a solvent and separately making up an aqueous ammoniacal solution of the appropriate stannous, ferrous or cuprous salt. The two solutions are then mixed and, upon moderate stirring, the emulsion is formed. This embodiment possesses a distinct advantage by making it possible to supply the ultimate consumer with two separate solutions from which he can easily formulate an emulsion to suit his particular needs and desires.

Before proceeding with a detailed description of the process of the invention, the preparation of several emulsions will be illustrated in specific examples. In the examples parts and percentages are by weight unless otherwise specified.

EXAMPLE 1

A resin solution was prepared by dissolving 50 parts of Dow Corning Silicone Resin 1107 (a methyl hydrogen polysiloxane) and 7.5 parts of myristic acid in 33 parts of toluene and 9.5 parts of perchloroethylene. Twenty (20) pounds of the resin solution was then added to an aqueous solution composed of 969.5 pounds of water, 2.5 pounds of commercial stannous chloride ($SnCl_2 \cdot 2H_2O$) and 8 pounds of ammonium hydroxide (28% $NH_3$) at a temperature of 85° F. A good emulsion was formed simply by stirring.

EXAMPLE 2

Twenty (20) pounds of the resin solution described in Example 1 was emulsified in 970 pounds of water containing 2 pounds of ammonium hydroxide solution (28% $NH_3$). To the emulsion there was then added with stirring 10% by weight of an ammoniacal copper chloride solution containing about 10% anhydrous cuprous chloride.

EXAMPLE 3

Two and five tenths (2.5) grams of cuprous chloride was placed in 500 ml. of water and stirred mechanically. There was then added 40 ml. of an ammonium hydroxide solution (28% $NH_3$) and stirring was continued until a clear solution was obtained. There was then added 20 ml. of the resin solution described in Example 1 and the total volume was made up to 1000 parts by addition of water. A good emulsion was obtained.

EXAMPLE 4

A solution of ferrous sulfate in water was prepared by dissolving 2.5 grams of ferrous sulfate in 480 ml. of water. To this solution there was added 4 ml. of an ammonium hydroxide solution (28% $NH_3$) and 2.5 grams of oleic acid with stirring. There was next added 10 ml. of the resin solution described in Example 1 with stirring. The resulting emulsion was diluted to 1000 ml. with water.

EXAMPLE 5

A resin solution was prepared by dissolving 50 grams of Dow Corning Silicone Resin 1107 and 10 grams of oleic acid in 33 grams of toluene and 9.5 grams of perchloroethylene. A clear solution was obtained by stirring.

There was prepared separately an aqueous solution by dissolving 2.5 grams of commercial grade $SnCl_2 \cdot 2H_2O$ and 8 ml. of ammonium hydroxide solution (28% $NH_3$) in 900 ml. of water at 85° F. To the aqueous solution there was added 20 grams of the resin solution with stirring and the resultant emulsion was diluted to 1000 grams with water.

EXAMPLE 6

An emulsion was prepared as in Example 5 except that the Dow Corning Silicone Resin 1107 was replaced by Dow Corning Silicone Resin 104 (a methyl hydrogen polysiloxane).

EXAMPLE 7

An emulsion was prepared according to Example 5 with the exception that linoleic acid was substituted for oleic acid, gram for gram.

From the preceding examples, it can be seen that in the formation of the various emulsions an ammonium fatty acid salt is formed in situ through the reaction of a fatty acid and ammonium hydroxide. Similarly, a metal hydroxide is formed in situ by the reaction of a metallic chloride or sulfate and ammonium hydroxide.

As will be demonstrated later, the emulsion of the invention is extremely effective in the imparting of water-repellency to textile fabrics. The advantageous results appear to be explainable theoretically. It is believed that during partial drying of the emulsion subsequent to its application to a textile a large quantity of ammonia is caused to evaporate allowing the reversion of the emulsifying agent to a free fatty acid. The fatty acid in turn is believed to react with the metal hydroxide forming a metal-fatty acid complex which is water-insoluble. Because of these reactions it is believed that the emulsifying agent is destroyed on partial drying thus allowing the emulsion to break and resulting in the formation of an oily layer of resin on the surface of the wet textile material. Furthermore, the water-insoluble metal-fatty acid complex which is believed to be formed does not contribute at all to the rewetting of the fabric but may instead actually assist in imparting water-repellency. The invention is not to be limited, however, by the preceding explanation nor is its validity to be effected thereby.

In the case of an ordinary type of emulsion, the emulsifying agent is not destroyed but instead remains effective until all of the water has been evaporated. Therefore, in the ordinary case, the particles of resin are retained in discrete form throughout the processing of the textile and thus there is no opportunity for the resin particles to coalesce and form a continuous film.

Another advantage of the emulsion which also appears to be explainable by the preceding explanation is that the temperatures needed to cure the silicone resin are much lower than the temperatures required in the case of an ordinary emulsion and, in some cases, even lower than the temperatures required to cure a resin which has been applied from a solution. This is believed to be a result of the formation of the metal-fatty acid complex which in turn results in a transference of the metal ions from the aqueous phase of the emulsion to the oil phase of the emulsion thereby promoting intimate contact between the silicone resin and the metal, which is believed to be active catalytic agent.

The emulsion can be applied to textiles by any method which results in the silicone resin being evenly deposited on the fabric in amounts at least equal to 0.1% of the weight of the dry fabric and preferably at least about 0.3% of the weight of the dry fabric. If the resin is deposited in amounts less than about 0.1%, the degree of water-repellency imparted to the fabric is not as great as is ordinarily desired and for the highest degree of water-repellency and the greatest permanency, about 0.3% or more silicone resin should be deposited on the fabric. On the other hand, there is usually little advantage in applying the resin in amounts greater than about 1% of the dry weight of the fabric and as the amount of resin deposited on the fabric reaches 2% to 4% by weight, the fabric develops an undesirable hand. Of course, the application of such large quantities is also disadvantageous from an economic point of view.

A convenient process of applying the emulsion to a textile fabric comprises simply immersing the fabric in the emulsion, for instance in a pad box, and then removing excess liquid, for example by passing the fabric through a pair of pressure rollers. The weight gain resulting from such a procedure is generally from about 50% to 100% of the dry weight of the textile material depending upon the type of fabric being treated and the pressure on the squeeze rolls. In this method of application, the amount of silicone resin deposited on the fabric depends primarily upon the amount of liquid remaining in the fabric after passage through the squeeze rolls and upon the concentration of resin in the emulsion. Since, as previously stated, optimum results are obtained when the weight of silicone resin deposited on the fabric is equal to from about 0.3% to 1% of the dry weight of the fabric, it can be seen that the optimum concentration of silicone resin in the emulsion when employing this method of application is from about 0.5% to 2% of the weight of the emulsion.

A second convenient process for applying the emulsion to a textile fabric comprises repeatedly passing the fabric into the emulsion, into the atmosphere and back into the emulsion. Such a process can be readily performed by means of an ordinary dye beck or similar apparatus and this is a great advantage as many textile finishing plants are not equipped with padding equipment. It is a unique characteristic of the emulsions of this invention that the silicone resin will exhaust onto a fabric in a manner reminiscent of a substantive dye from a dyebath thus enabling one to employ dyeing equipment in their application.

In the exhaustion method of applying the new silicone emulsions, the primary consideration is not the concentration of the emulsion employed since the ratio of total weight of resin present in the emulsion, regardless of the volume of liquid, to the weight of fabric primarily determines what quantity of resin will eventually be deposited on the textile material. This is simply because substantially all of the resin in the bath is eventually exhausted onto a selected weight of fabric. However, since most of the apparatus in common usage at the present time is designed to best operate with a weight of liquid equal to 5 to 100 times the weight of fabric, it can be said that the concentration of resin in the emulsion should preferably be from about 0.003% to 0.2% of the weight of emulsion and, as a matter of convenience, the concentration of resin will generally be in the range of from about 0.01% to 0.1% of the weight of the emulsion.

It should also be mentioned that in the exhaustion method of application, better results are obtained if a quantity of the stannous, cuprous or ferrous salt used in originally preparing the emulsion is added after the treatment of the fabric has been initiated. The primary reason for this appears to be that the quantity of stannous, cuprous or ferrous hydroxide in the emulsion influences the rate of exhaustion of the resin onto the fabric and for complete exhaustion an excess of the hydroxide is needed. But, on the other hand, if a large excess of the hydroxide is present at the start of operations, exhaustion is so rapid that uniformity is not obtained. A satisfactory procedure has been found to comprise starting operations with the emulsion containing a quantity of the hydroxide equal to from about 5% to 60% of the weight of silicone resin and then as treatment progresses, gradually adding as an aqueous solution, a weight of the stannous, cuprous or ferrous salt, originally employed in the preparing the emulsion, equal to at least about 10% of the weight of the silicone resin originally present. Of course, near the end of the operation there is very little silicone resin present in the emulsion as most of it has already exhausted onto the fabric and the salt addition at this point provides a very large excess of metal hydroxide. Reasonably complete exhaustion of the bath with excellent results generally takes no longer than about 15 or 20 minutes.

Drying of the fabric and curing of the silicone resin can be effected to a certain extent simultaneously, although the actual curing of the resin probably does not occur to a material extent until most of the water has been removed. The drying and curing can be accomplished simply by heating the wetted fabric at an elevated temperature, say from about 100° to 300° F. for a few minutes. However, an elevated temperature is not necessary because suitable drying and curing can be caused to occur merely by allowing the wetted fabric to stand in air for a few days.

In the treatment of the textile fabrics by the process of the invention, the best results are obtained if the fabric is thoroughly clean at the time of treatment because it has been found that certain substances such as spinning oils and wetting agents tend to interfere with and sometimes destroy the efficacy of the water-repellent treatment. Generally, such substances can be removed by conventional scouring techniques. The use in prior processing of the fabric of substances which cannot be so removed should be avoided.

The application of the emulsion to the treatment of textiles is illustrated in the following examples:

EXAMPLE 8

A pre-scoured fabric, composed of 45% wool and 55% Dacron polyester fibers, was immersed in the emulsion of Example 1, squeezed to a pick up of from about 60 to 110%, dried on a tenter frame and cured ten minutes at 200° F. on a Loop Dryer. The fabric was highly water-repellent and the water-repellency was durable to both dry cleaning and washing. The hand of the fabric was also excellent.

EXAMPLE 9

An acetate rayon fabric which had been previously prepared, dried, resin treated, washed and extracted by means of a suction bar to a moisture content of 60% was passed into the emulsion of Example 1, squeezed to a pick up of 85%, dried on a tenter frame at 240° F. and cured six minutes at 300° F. The fabric after treatment with the emulsion possessed excellent water-repellency even though, in this example, the pick up of silicone resin was very limited. The hand of the treated fabric was also excellent.

After running more than 1,200 yards of fabric through 400 pounds of emulsion, the effectiveness of the emulsion was not altered measurably.

Similar results were obtained following the procedure of this example except that the curing operation was replaced by seven days aging at room temperature. The fabric nevertheless possessed excellent water-repellency and the finish was durable to both washing and dry cleaning.

EXAMPLE 10

An acetate rayon fabric was immersed in the emulsion of Example 2, dried, and cured for five minutes at 320°

F. The fabric, after treatment, was water-repellent and the water-repellent finish was durable to both washing and dry cleaning. There was, however, a slight discoloration of the fabric which appeared to be the result of a bluish-brown copper deposit.

EXAMPLE 11

An acetate rayon fabric was treated with the emulsion of Example 3 following the procedure of Example 8 with a curing time of about 5 to 10 minutes at 190° F. Again, an excellent, durable, water-repellent finish was obtained and the hand of the treated fabric was virtually indistinguishable from that of the untreated fabric.

EXAMPLE 12

An acetate rayon fabric was treated for water-repellency using the emulsion of Example 4 and the procedure of Example 8 with a curing temperature of 10 minutes at 190° F. Again, an excellent, durable, water-repellent finish was obtained without appreciably changing the hand of the fabric.

EXAMPLE 13

The emulsion of Example 5 was used to treat fabrics composed of wool, nylon, Orlon acrylic fiber, viscose rayon and glass by the process of Example 8. Curing time was 10 minutes at 190° F. Excellent water-repellency was obtained on each type of fabric without appreciably changing the hand of the fabric.

EXAMPLE 14

Rayon acetate fabric was treated with the emulsions of Examples 6 and 7 using the procedure of Example 8. In both cases, the treated fabrics were highly water-repellent.

EXAMPLE 15

A series of emulsions were prepared according to the procedure of Example 1 with variations in the amounts of silicone resin and stannous chloride. The emulsions were then used to treat pieces of fabric, composed of 55% Orlon acrylic fibers and 45% wool, by the procedure of Example 8. The treated fabric was then tested for water-repellency, the results are as follows:

*Table I*

| Concentration | | Water-Repellency | | |
|---|---|---|---|---|
| Silicone, DC 1107 | SnCl$_2$.2H$_2$O | Initial [1] | After 3 Dry Cleanings [2] | After 3 Washes [3] |
| | Percent | | | |
| 2.0% | 0.1 | 100 | 100 | 100 |
| | 0.25 | 100 | 100 | 100 |
| | 0.5 | 100 | 100 | 100 |
| 1.0% | 0.1 | 100 | 90 | 90 |
| | 0.25 | 100 | 100 | 100 |
| | 0.5 | 100 | 100 | 100 |
| 0.5% | 0.1 | 80 | 80 | 80 |
| | 0.25 | 100 | 100 | 100 |
| | 0.5 | 100 | 100 | 100 |
| 0.25% | 0.1 | 80 | 70 | 50 |
| | 0.25 | 100 | 100 | 80 |
| | 0.5 | 100 | 100 | 90 |
| 0.1% | 0.1 | 0 | 0 | 0 |
| | 0.25 | 90 | 80 | 70 |
| | 0.5 | 100 | 90 | 70 |
| 0.00% | 0.1 | 0 | 0 | 0 |
| | 0.25 | 0 | 0 | 0 |
| | 0.5 | 0 | 0 | 0 |
| 2.0% | 0 | 0 | 0 | 0 |

[1] Spray test #22—52 AATCC water-repellency.
[2] Spray test after dry cleaning by CCCT—191 6 method 5509.
[3] Spray test after washing by AATCC test 40-52 (water temperature 140° F.).

EXAMPLE 15A

The treatment described in Example 15 was compared for effectiveness with treatments using two competitive silicone resin emulsions which are sold commercially and also a solution of silicone resin prepared in the laboratory. The silicone resin in all cases was a methyl hydrogen polysiloxane. The catalyst was one recommended by the manufacturer, i. e., the zinc salt of 2-ethyl hexoic acid. The solvent used in preparing the solution was Varsol. Each preparation was diluted with water so that it contained 1% by weight of resin.

The results are as follows:

*Table II* [1]

| | Initial Water-Repellency | Water-Repellency After 3 Dry Cleanings | Water-Repellency After 3 Washings |
|---|---|---|---|
| Competitive Emulsion #1 | 90 | 80 | 80 |
| Competitive Emulsion #2 | 90 | 80 | 70 |
| Solution | 100 | 100 | 80 |

[1] See Table I for explanation of testing methods.

A comparison of these results with the results from the application of the emulsion of the invention containing 1% of silicone resin and 0.25% stannous chloride shown in Table I demonstrates the much lower resin requirements of the emulsion of the invention. In order to obtain comparable results with the competitive emulsions, it is necessary that they contain at least about 3%, by weight, of silicone resin.

EXAMPLE 16

In a mixture of 3⅓ lbs. of toluene and .9 lb. of perchlorethylene there was dissolved 5 lbs. of Dow Corning Silicone Resin 1107 and ¾ lb. of myristic acid. This solution was then added at 80° F. and with constant stirring to an aqueous solution prepared from 480 lbs. of water, 2 lbs. of commercial stannous chloride and 4 lbs. of ammonium hydroxide (28% NH$_3$) to give an ammoniacal aqueous emulsion of the silicone resin.

A dye beck was loaded with 1000 lbs. (dry weight) of wool gabardine and 10,000 lbs. of tap water and to the water in the dye beck there was then added the previously prepared emulsion of silicone resin. The machine was then placed in operation and the cloth allowed to run through the bath for 10 minutes after which time it was found that fair exhaustion of the bath had been obtained. There was then gradually added 1 lb. of commercial stannous chloride as a 10% aqueous solution and operation continued for 5 minutes. The exhaustion of the bath was then substantially complete.

The cloth was removed from the dye beck and passed through squeeze rollers to remove excess water. The material at this time had a moisture content of 80% of dry weight. It was then dried at a temperature of 180° F. and stored at room temperature for five days. Tests proved the material to have excellent water-repellency, durable to both dry cleaning and washing, and the hand of the material was substantially unchanged.

EXAMPLE 17

An emulsion was prepared as in Example 16 except that in place of ¾ lb. of myristic acid there was employed 0.6 lb. of myristic acid and 0.2 lb. of palmitic acid. The emulsion was employed with excellent results in imparting water-repellency to a 1000 lb. sample of material, containing 55% Dacron polyester fibers and 45% wool, by the procedure of Example 16.

It is intended to cover all changes and modifications in the examples of the invention, herein given for purposes of disclosure, which do not constitute departure from the spirit and scope of the appended claims.

We claim:

1. A composition comprising an ammoniacal aqueous emulsion of a silicone resin having active hydride radicals and which is capable of further polymerization upon curing, said emulsion containing an emulsifying agent comprising an ammonium salt of an organic acid and additionally containing a metal hydroxide selected from the group consisting of stannous, cuprous and ferrous hydroxides.

2. A composition comprising an ammoniacal aqueous emulsion containing not more than about 10% by weight of a silicone resin having active hydride radicals and which is capable of further polymerization upon curing, from about 2.5 to about 100% by weight, based on the silicone resin, of an emulsifying agent comprising an ammonium salt of an organic acid, and a quantity of a metal hydroxide selected from the group consisting of stannous, cuprous and ferrous hydroxides equal to at least about 1% by weight of the silicone resin and not more than about 5% be weight of the aqueous emulsion.

3. A composition according to claim 2 in which the silicone resin comprises an alkyl hydrogen polysiloxane.

4. A composition according to claim 3 in which the silicone resin comprises methyl hydrogen polysiloxane.

5. A composition according to claim 3 in which the metal hydroxide comprises stannous hydroxide.

6. A composition according to claim 5 in which the metal hydroxide comprises stannous hydroxide and the composition additionally contains stannic compounds in an amount equal to at least 5% by weight of the stannous hydroxide.

7. A composition according to claim 2 in which the ammonium salt of an organic acid comprises an ammonium salt of a fatty acid having from 12 to 18 carbon atoms.

8. A composition according to claim 7 in which the silicone resin comprises a methyl hydrogen polysiloxane, the metal hydroxide comprises stannous hydroxide and the composition additionally contains stannic compounds in an amount equal to at least 5% by weight of the stannous hydroxide.

9. A composition according to claim 8 in which the ammonium salt comprises ammonium myristate.

10. A composition comprising an ammoniacal aqueous emulsion containing from about 0.01% to about 2% by weight of an alkyl hydrogen polysiloxane silicone resin capable of further polymerization upon curing and in which the alkyl groups are lower alkyl radicals, from about 10 to about 30% by weight of the silicone resin of emulsifying agent comprising an ammonium salt of an organic acid, a quantity equal to at least 2% of the weight of the silicone resin and not more than 1% of the weight of the emulsion of a metal hydroxide selected from the group consisting of stannous, cuprous and ferrous hydroxides, and an organic solvent in an amount sufficient to dissolve the silicone resin during the preparation of the emulsion.

11. A composition according to claim 10 in which the ammonium salt of an organic acid comprises an ammonium salt of a fatty acid having from 12 to 18 carbon atoms.

12. A composition according to claim 11 in which the metal hydroxide comprises stannous hydroxide and the composition additionally contains stannic salts in an amount equal to at least 5% by weight of the stannous hydroxide.

13. A composition according to claim 12 in which the silicone resin comprises a methyl hydrogen polysiloxane.

14. A composition according to claim 13 in which the ammonium salt comprises ammonium myristate.

15. A process for the preparation of an emulsion useful for rendering textile fabrics water-repellent which comprises mixing together water, a silicone resin having active hydride radicals and which is capable of further polymerization upon curing, an organic acid the water soluble salts of which have emulsifying properties, ammonium hydroxide, and a salt selected from the group consisting of stannous, ferrous and cuprous salts which are capable of being converted into the corresponding hydroxide in ammoniacal solution, and emulsifying the mixture.

16. A process according to claim 15 in which the silicone resin is used in an amount equal to from about 0.003 to about 10% by weight of the emulsion, the organic acid is used in an amount equal to from about 2.5 to about 100% by weight of the silicone resin, the salt is used in an amount stoichiometrically equivalent to not more than about 1% by weight of the corresponding hydroxide based on the weight of the emulsion, and the ammonium hydroxide is used in excess of the amount required to combine stoichiometrically with the fatty acid and said salt.

17. A process for the preparation of an emulsion useful for rendering textile fabrics water-repellent which comprises mixing together an organic solvent solution of a silicone resin having active hydride radicals and which is capable of further polymerization upon curing, and an organic acid the salts of which have emulsifying properties, and an aqueous ammoniacal solution of a salt selected from the group consisting of stannous, ferrous and cuprous salts which are capable of being converted into the corresponding hydroxide in ammoniacal solution.

18. A process according to claim 17 in which the silicone resin is a methyl hydrogen polysiloxane.

19. A process according to claim 18 in which the salt is a stannous salt.

20. A process for rendering a textile fabric water-repellent which comprises wetting said fabric with the emulsion of claim 1 and thereafter drying said fabric and curing the silicone resin thereon.

21. A process for rendering a textile fabric water-repellent which comprises wetting said fabric with the emulsion of claim 2 and thereafter drying said fabric and curing the silicone resin thereon.

22. A process for rendering a textile fabric water-repellent which comprises wetting said fabric with the emulsion of claim 8 and thereafter drying said fabric and curing the silicone resin thereon.

23. A process for rendering a textile fabric water-repellent which comprises wetting said fabric with the emulsion of claim 10 and thereafter drying said fabric and curing the silicone resin thereon.

24. A process for rendering a textile fabric water-repellent which comprises wetting said fabric with the emulsion of claim 12 and thereafter drying said fabric and curing the silicone resin thereon.

25. A process for rendering a textile fabric water-repellent which comprises wetting said fabric with the emulsion of claim 13 and thereafter drying said fabric and curing the silicone resin thereon.

26. A process for rendering a textile fabric water-repellent which comprises immersing the dry fabric in an ammoniacal aqueous emulsion containing from about 0.5% to about 2% by weight of an alkyl hydrogen polysiloxane silicone resin in which the alkyl groups are lower alkyl radicals and which is capable of further polymerization upon curing, from about 10% to 30% by weight of the silicone resin of an ammonium salt of a fatty acid having 12 to 18 carbon atoms, and from about 5% to 60% by weight of the silicone resin of stannous hydroxide, said stannous hydroxide constituting less than 1% by weight of the emulsion, removing excess liquid from the fabric so that the weight gain of the fabric is from about 50% to 100% of the dry weight and the silicone resin retained by the fabric is from about 0.3% to 1% of the dry weight of the fabric, and drying the fabric.

27. The method of claim 26 wherein the drying is at a temperature of from about 100° F. to 300° F. and the fabric is thereafter maintained at substantially room temperature for at least 4 days to further increase the ability of the fabric to withstand washing and dry cleaning without loss of water-repellency.

28. The method of claim 27 wherein the fabric is one containing polyester fibers and the drying is conducted at a temperature below about 250° F.

29. A process for rendering a textile fabric water-repellent which comprises repeatedly passing the fabric into an ammoniacal aqueous emulsion, into the atmosphere and back into the emulsion, the weight of said emulsion being from 5 to 100 times the dry weight of said fabric and said emulsion originally comprising a weight of an alkyl hydrogen polysiloxane silicone resin equal to about 0.3% to 1% of the dry weight of said fabric, the alkyl groups in said alkyl hydrogen polysiloxane silicone resin being lower alkyl groups, and said resin being one which is capable of further polymerization upon curing, a weight of an ammonium salt of a fatty acid having 12 to 18 carbon atoms equal to about 10% to 30% of the weight of silicone resin and a weight of stannous hydroxide equal to about 5% to 60% of the weight of silicone resin, removing the fabric from the emulsion when there has been deposited thereon a weight of silicone resin equal to from 0.3% to 1% of the dry weight of the fabric, and drying the fabric.

30. The method of claim 29 wherein there is gradually added to the ammoniacal aqueous emulsion, when the silicone resin originally present therein has been largely transferred to the fabric, a quantity, as an aqueous solution, of a stannous salt to effect substantially complete exhaustion of the silicone resin onto the fabric.

31. The method of claim 29 wherein the drying is at a temperature of from about 100° F. to 300° F. and the fabric is thereafter maintained at substantially room temperature for at least 4 days to further increase the ability of the fabric to withstand washing and dry cleaning without loss of water-repellency.

32. The method of claim 31 wherein the fabric is one containing polyester fibers and the drying is conducted at a temperature below about 250° F.

33. A composition useful as an intermediate in the preparation of a silicone resin emulsion comprising a methyl hydrogen polysiloxane resin capable of further polymerization upon curing, and a fatty acid having from 12 to 18 carbon atoms dissolved in an organic solvent, said organic solvent comprising a mixture of perchloroethylene and toluene.

34. A composition as in claim 33 wherein the fatty acid comprises a mixture of myristic and palmitic acids.

35. A process for rendering a textile fabric water repellent which comprises wetting said fabric with the emulsion of claim 1, subjecting said fabric to drying conditions to remove moisture and break said emulsion and to thereby result in a reaction of the metal hydroxide with the organic acid to form a water insoluble reaction product intimately dispersed with said silicone resin and capable of acting as a catalyst for the further polymerization thereof, and curing said silicone resin in the presence of said water insoluble reaction product to thereby form an evenly distributed film of the polymerized silicone resin over the surface of said fabric, whereby the fabric retains its water repellent characteristics even after repeated washings.

References Cited in the file of this patent

UNITED STATES PATENTS

| | | |
|---|---|---|
| 2,386,259 | Norton | Oct. 9, 1945 |
| 2,482,307 | Walker et al. | Sept. 20, 1949 |
| 2,588,366 | Dennett | Mar. 11, 1952 |
| 2,588,393 | Kauppi | Mar. 11, 1952 |
| 2,660,736 | Biefeld | Dec. 1, 1953 |
| 2,673,825 | Biefeld et al. | Mar. 30, 1954 |

FOREIGN PATENTS

| | | |
|---|---|---|
| 645,768 | Great Britain | Nov. 8, 1950 |